United States Patent Office
2,724,646
Patented Nov. 22, 1955

2,724,646

METHOD FOR BENEFICIATING MANGANESE-CONTAINING MATERIALS

William Stephen Stringham and Glenn Nelson Summers, Joplin, Mo., assignors to Bruce Williams, Joplin, Mo.

No Drawing. Application July 12, 1954,
Serial No. 442,928

7 Claims. (Cl. 75—110)

This invention relates to a new and improved process for recovering manganese from manganese-containing materials such as ores and slags.

In our co-pending application Serial Number 430,984, filed May 19, 1954, a new and improved hydrometallurgical process for recovering manganese from manganese-containing materials is described which broadly comprises roasting a manganese-containing material with ammonium sulfate, ammonium bisulfate, ammonium sulfite, ammonium bisulfite or mixtures thereof in combination with ammonium chloride at elevated temperatures to form manganese sulfate and manganese chloride, leaching these soluble compounds with water and then recovering the manganese from solution. The sulfate and sulfite salts react with the manganese in the manganic state to form manganese sulfate and the ammonium chloride reacts with manganese in the manganous state to form manganese chloride. Thus the manganese in both the higher and lower states of oxidation are recovered simultaneously without requiring a preliminary high temperature reduction roast. Ammonium chloride is incorporated even if all of the manganese is in the manganic state since it improves recovery. Roasting temperatures are maintained above the decomposition temperature of manganese dithionate.

The process as described in our co-pending application is highly advantageous in many ways. It eliminates the need for preliminary reduction roasts and the formation of products such as dithionates which require difficult and expensive processing. Conversion temperatures are low as compared with usual roast temperatures. The leached, soluble salts may be obtained in the desired maximum concentration without requiring costly evaporation of excessively dilute solutions. Reagents are easily recovered and recycled. High recovery of manganese values from both low and high grade ores are obtained economically with a minimum of manipulative procedures in conventional apparatus.

The process is particularly advantageous for processing of soft, pulverulent ores and ores of high impurity content, such as iron and phosphorous, which has hitherto been economically unfeasible because of high cost and low recovery. Impurities such as iron and phosphorous are not appreciably solubilized by the process and the small amounts present as soluble constituents of the ore which do go into solution with the manganese sulfate and manganese chloride are easily separated.

Although this process can be employed successfully with manganese-containing materials of substantial free silica content, manganese recovery, though generally higher than that obtained with prior processes, is adversely affected by the presence of manganese which is chemically combined with silica, alumina, complex iron compounds and the like or which, though in the form of the oxide, is in highly intimate solid solution with silica, silicates, aluminates or other complex insolubles.

Recovery of manganese from such refractory materials by prior processes has been both so low and so expensive as to make it prohibitive commercially.

The object of this invention is to provide a new and improved process for recovering manganese from manganese-containing materials, such as ores and slags, which permits high recovery regardless of the state of chemical combination or solution of the manganese.

We have discovered that by including an ammonium fluoride salt, namely ammonium fluoride, ammonium bifluoride or mixtures of both, in the roast along with the ammonium chloride and ammonium sulfate or sulfite salts as disclosed in our aforementioned co-pending application, recovery of manganese is greatly increased in the case of manganese-containing materials in which the manganese is chemically combined in the form of silicates, aluminates or the like or is in such intimate solid solution with refractory insolubles such as silica, silicates, aluminates or the like that it cannot readily be separated by the hydrometallurgical treatment. The extent of recovery increase obtained by addition of the fluoride salts is largely determined by the amount of such refractory insoluble components, the more present, the greater being the recovery increase.

The function of the fluoride salts in the actual metallurgical recovery of the manganese resides in their action with some of the refractory insoluble components whereby the manganese is released in such condition that it is amenable to reaction with the ammonium chloride and ammonium sulfate or sulfite salts with resulting increased manganese recovery.

The reactions which take place during treatment with the ammonium fluoride salts are complex and not entirely understood. It is believed that in the case of a silicate-containing material, for example, the ammonium fluoride salt, which sublimes at the roasting temperatures, decomposes and reacts to form ammonia, water and gaseous silicon fluoride, leaving the manganese in the form of the oxide as follows:

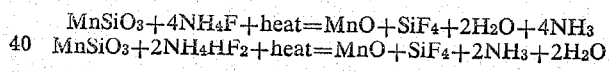

The silicon tetrafluoride, which is recovered in an absorption column, reacts with ammonia and water as follows:

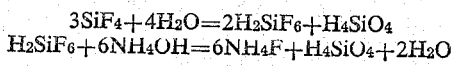

the ammonium fluoride may thus be recovered and recycled. Because of its relative instability, the ammonium fluoride to some extent decomposes to form ammonium bifluoride as follows:

The addition of even small amounts of the fluoride salts increases manganese recovery. Optimum recovery is obtained when the fluoride is added in sufficient amount or in some excess of the amount required for it to act on the refractory or interfering components in the manganese-containing material. Since the amounts of such components is sometimes difficult to determine analytically, the amount of fluoride salt required for optimum recovery with a particular ore or slag can readily be determined by routine testing.

Addition of the fluoride salt does not appreciably alter the conditions of the hydrometallurgical process aforedescribed. The fluoride is added with the ammonium chloride and ammonium sulfate, bisulfate, sulfite or bisulfite salts to the manganese-containing materials and the mixture is roasted with agitation at a temperature above the decomposition temperature of manganese dithionate and preferably at a temperature of about 850° to 1000° F., about 900° to 1000° F. being optimum, until fuming ceases, generally in about 2 hours. The salts may be introduced dry or in the form of a concentrated solution or slurry such as that obtained in the subsequent recovery of the various reagents. Where such an aqueous solution or slurry is employed, the water is rapidly evaporated by the high temperatures of the kiln and then the reactions between the manganese-containing material and the various ammonium salts proceed in the dry state.

The ammonium chloride and ammonium sulfate or sulfite salts should be introduced in amounts in excess of the theoretical quantity required for reaction with the manganese, preferably in an excess of about 10 to 25%. The fluoride used in any amount increases recovery. Optimum increase in recovery is generally obtained with amounts in excess of about 10 to 35% over theoretical.

The fumed ammonium chloride is suitably collected and the gaseous products, including ammonia, excess sulfur dioxide, nitrogen, fluorine compounds and air are drawn through an absorption column containing water. The recovered aqueous solution contains ammonium sulfite, ammonium bisulfite, ammonium hydroxide, ammonium fluoride, ammonium bifluoride and silica.

After completion of the reaction, the treated material is leached with water to dissolve the soluble manganese sulfate and manganese chloride salts. Because of the high solubility of these manganese salts, the amount of water can be kept to a minimum to produce a very concentrated solution, thus avoiding the necessity for subsequent concentration by evaporation. The amount of impurities such as iron, phosphorous, silica, alumina, alkalies and alkaline earth in the pregnant solution is very low and can readily be separated. The pH of the solution is generally about 2.4 to 2.8.

Iron in the ferric condition may be precipitated as ferric hydroxide by neutralizing the solution to about pH 4.5 with ammonia. If the calcium ion content of the solution is not high enough to precipitate all of the phosphorous as tri-calcium phosphate, this may be accomplished by adding sufficient calcium hydroxide to bring the pH up to about 5.5. Additional ammonia or ammonium hydroxide is then added to raise the pH to about 6.8 to 7.2 to precipitate all remaining iron and phosphorous as iron hydroxide and phosphorous pentoxide.

The soluble manganese sulfate and manganese chloride salts are separated from the filtered solution by addition of ammonia and carbon dioxide in gaseous form or ammonium carbonate to precipitate manganese carbonate and to form ammonium sulfate and ammonium chloride which remains in solution.

The manganese carbonate is filtered and washed and then heated to drive off carbon dioxide. If calcination is carried out in the absence of air, MnO is formed. By introducing air into the calcining furnace, $MnO_2$ is produced. The carbon dioxide may be recovered by passing it through water in an absorption column. Preferably, it is absorbed by a portion of the recovery liquor resulting from absorption of the ammonia and sulfur dioxide gases produced during reaction of the manganese ore with the ammonium sulfate or sulfite salts and ammonium chloride. The carbon dioxide reacts with the ammonium hydroxide present in the recovery liquor to produce ammonium carbonate which may be reused to precipitate the manganese from its soluble salts in the leaching solution.

The recovered, fumed ammonium chloride and the recovery liquors containing the other various ammonium salts may be combined and recycled in the process. The solutions may be evaporated to dryness or, if not already so, to a saturated solution or slurry before reuse.

Our process is particularly effective for use with manganese-containing slags because of their high vitreous and refractory character. Even high manganese-content slags have hitherto posed such difficult recovery problems that few successful commercial attempts have been made to salvage the manganese. By our process, manganese recovery from slags as high as over 96% may be obtained. Manganese recovery from ores runs as high as 98.5%.

The following examples are illustrative of the greatly increased manganese recovery obtained with ores and slags of high silicate and other refractory insoluble content by addition of an ammonium fluoride salt.

*Example.—Maine Aroostook ore containing 11.78% Mn*

The ore was dried at 105° C. and ground to pass 200 mesh. 10 g. of the sample were combined with 3 g. ammonium sulfate and 1 g. ammonium chloride. The mixture was thoroughly blended, placed in a rotating retort and heated to 900° F. until fuming stopped in about two hours. Enough water to make a 15% solution of manganese sulfate was added for leach. The leach residue was filtered and washed. The solution, which had a pH of 2.3, was neutralized to pH 4.5 to precipitate ferric hydroxide with ammonia, then to pH 5.4 with calcium hydrate to precipitate phosphorous as tri-calcium phosphate, and then to pH 7.0 with additional ammonia. The solution was allowed to settle and filtered. Sufficient ammonium carbonate was added to the clear filtrate to raise pH to 8.5. The precipitated manganese carbonate was filtered and washed. The residue was dried and ignited to $MnO_2$. Recovery of total manganese was 73.50%.

Another 10 g. sample of the same ore was treated in identical fashion as above except that 3 g. ammonium bifluoride was added to the mixture in the retort prior to roasting. Recovery of manganese was 86.48%.

Procedures similar to that used in the example were employed in tests, the results of which are set out in the following table.

TABLE
[Basic slag, Bethlehem Steel Company, Johnstown, Pennsylvania, 9.54% Mn]

| Slag grams | $(NH_4)_2SO_4$, grams | $NH_4Cl$, grams | $NH_4HF_2$, grams | Manganese Recovery, Percent |
|---|---|---|---|---|
| 10 | 3 | 1 | none | 47.65 |
| 10 | 3 | 1 | 3 | 76.62 |
| 10 | 6 | 1 | 3 | 86.93 |
| 10 | 6 | 1 | 6 | 88.87 |

[Composite slags, basic, open hearth and flue dust, 23.55% Mn]

| Slag grams | $(NH_4)_2SO_4$, grams | $NH_4Cl$, grams | $NH_4HF_2$, grams | Manganese Recovery, Percent |
|---|---|---|---|---|
| 10 | 6.2 | 2.5 | none | 48.49 |
| 10 | 6.2 | 2.5 | 2 | 57.26 |
| 10 | 6.2 | 2.5 | 2.5 | 68.79 |
| 10 | 6.2 | 2.5 | 3.0 | 77.75 |
| 10 | 6.2 | 2.5 | 3.5 | 81.38 |
| 10 | 6.2 | 2.5 | 4.0 | 90.91 |
| 10 | 10.0 | 2.5 | 4.0 | 96.54 |

Although this invention has been described with reference to illustrative embodiments thereof, it will be apparent to those skilled in the art that it may be embodied in other forms but within the scope of the appended claims.

We claim:

1. Process for recovering manganese from manganese-containing material which comprises roasting the material with ammonium chloride, a compound selected from the group consisting of ammonium sulfate, ammonium bisulfate, ammonium sulfite and ammonium bisulfite and mixtures thereof, and a compound selected from the group consisting of ammonium fluoride, ammonium bifluoride and mixtures thereof, at a temperature above the decomposition temperature of manganese dithionate, and then leaching the roast with water to dissolve the soluble manganese salts.

2. The process of claim 1 in which the roasting temperature is about 850° to 1000° F.

3. Process for recovering manganese from manganese-containing material which comprises roasting the material with ammonium chloride and a compound selected from the group consisting of ammonium sulfate, ammonium bisulfate, ammonium sulfite and ammonium bisulfite and mixtures thereof, said ammonium salts being employed in excess of the amount theoretically required to combine with the manganese present in said material, together with a compound selected from the group consisting of ammonium fluoride, ammonium bifluoride and mixtures thereof, at a temperature of about 850° to 1000° F., and then leaching the roast with water to dissolve the soluble manganese salts.

4. The process of claim 3 in which the fluoride salt is ammonium bifluoride.

5. Process for recovering manganese from manganese-containing material which comprises roasting the material with ammonium chloride, ammonium sulfate and ammonium bifluoride at a temperature of about 850° to 1000° F. and then leaching the roast with water to dissolve the soluble manganese salts.

6. The process of claim 5 in which the ammonium chloride and ammonium sulfate salts are in excess of the amount theoretically required to combine with the manganese present in the material and the roasting temperature is about 900° to 1000° F.

7. The process of claim 3 in which the roasting temperature is about 900° to 1000° F.

References Cited in the file of this patent

UNITED STATES PATENTS

| | | |
|---|---|---|
| 442,016 | Coffin | Dec. 2, 1890 |
| 543,284 | Besemfelder | July 23, 1895 |
| 1,426,890 | McClenahan | Aug. 22, 1922 |
| 1,426,891 | McClenahan | Aug. 22, 1922 |
| 1,835,474 | De Witt | Dec. 8, 1931 |
| 2,176,774 | Sweet et al. | Oct. 17, 1939 |
| 2,176,775 | Sweet et al. | Oct. 17, 1939 |
| 2,176,776 | Sweet et al. | Oct. 17, 1939 |

FOREIGN PATENTS

| | | |
|---|---|---|
| 456,058 | Great Britain | Nov. 2, 1936 |
| 457,315 | Great Britain | Nov. 25, 1936 |